(12) United States Patent
French et al.

(10) Patent No.: US 6,885,425 B2
(45) Date of Patent: Apr. 26, 2005

(54) ACTIVE PLATE FOR A DISPLAY DEVICE HAVING A CONDUCTIVE LAYER WITH INCREASED CONDUCTIVITY

(75) Inventors: Ian D. French, Hove (GB); Pieter J. Van der Zaag, Pyrford (GB); Eric A. Meulenkamp, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 10/265,877

(22) Filed: Oct. 7, 2002

(65) Prior Publication Data

US 2003/0034525 A1 Feb. 20, 2003

Related U.S. Application Data

(62) Division of application No. 09/998,031, filed on Nov. 29, 2001, now Pat. No. 6,498,087.

(30) Foreign Application Priority Data

Jan. 12, 2000 (GB) .............................................. 0029315

(51) Int. Cl.$^7$ ........................ G02F 1/1343; H01L 21/44
(52) U.S. Cl. ....................... 349/147; 349/148; 438/608; 438/609
(58) Field of Search ........................... 349/42, 43, 147, 349/148; 438/608, 609; 257/750

(56) References Cited

U.S. PATENT DOCUMENTS

| | | | | |
|---|---|---|---|---|
| 4,723,838 A | * | 2/1988 | Aoki et al. | 349/47 |
| 5,162,901 A | * | 11/1992 | Shimada et al. | 349/39 |
| 5,187,601 A | * | 2/1993 | Yamazaki et al. | 349/187 |
| 5,831,708 A | * | 11/1998 | Hiraishi et al. | 349/143 |
| 6,057,038 A | * | 5/2000 | Terashita et al. | 428/447 |
| 6,222,600 B1 | * | 4/2001 | Hirano | 349/113 |
| 6,380,098 B1 | * | 4/2002 | Jeong et al. | 438/745 |
| 6,462,792 B1 | * | 10/2002 | Ban et al. | 349/39 |

* cited by examiner

Primary Examiner—Erik Kielin

(57) ABSTRACT

A method of increasing the conductivity of a transparent conductive layer, in which a photoresist layer which patterns the transparent layer is given tapered edges and is partially etched. The partial etching exposing the edge regions of the underlying transparent conductor layer, which are the selectively plated. This method has a single patterning stage of the transparent layer, but uses partial etching of a tapered resist layer in order to expose a small edge region of the transparent layer for coating with a conductive layer (which can be opaque).

16 Claims, 6 Drawing Sheets

ACTIVE PLATE FOR A DISPLAY DEVICE HAVING A CONDUCTIVE LAYER WITH INCREASED CONDUCTIVITY

CROSS REFERENCE TO RELATED APPLICATIONS

This is a divisional of application Ser. No. 09/998,031, filed Nov. 29, 2001 now U.S. Pat. No. 6,498,087.

This invention relates to a method of increasing the conductivity of transparent layers, in particular for use in the manufacture of pixellated devices such as active matrix liquid crystal displays. The invention also relates to the transistor substrate, known as the active plate, used in the manufacture of such displays.

A liquid crystal display typically comprises an active plate and a passive plate between which liquid crystal material is sandwiched. The active plate comprises an array of transistor switching devices, typically with one transistor associated with each pixel of the display. Each pixel is also associated with a pixel electrode on the active plate to which a signal is applied for controlling the brightness of the individual pixel. Liquid crystal displays may be arranged as transmissive or reflective devices.

Figure 1:
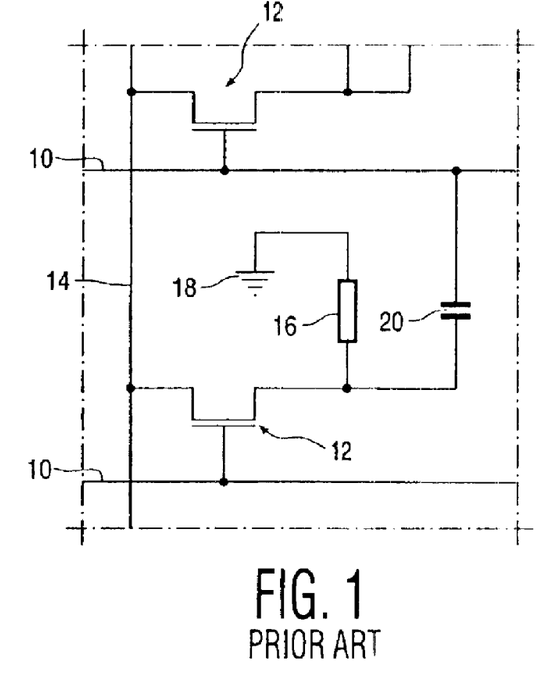
FIG. 1 shows the pixel components of an active plate.

FIG. 1 shows the electrical components which make up the pixels of one known example of active plate of an LCD. The pixels are arranged in rows and columns. The row conductor 10 of a pixel is connected to the gate of the TFT 12, and the column electrode 14 is coupled to the source. The liquid crystal material provided over the pixel effectively defines a liquid crystal cell 16 which extends between the drain of the transistor 12 and a common ground plane 18. An optional pixel storage capacitor 20 is connected between the drain of the transistor 12 and the row conductor 10 associated with an adjacent row of pixels.

A large area of the active plate is at least partially transparent, and this is required because the display is typically illuminated by a back light. In conventional display devices, the pixel electrode must be transparent, whereas row and column conductors are formed as metallic opaque lines. Metallic layers, such as chromium, molybdenum, aluminium, alloys or multilayer structures, are used for the row and column conductors because of the high conductivity, which improves the device performance. The conductivity of the lines (usually the column lines) to which the pixel drive signals are applied is particularly important in large displays, because a sizeable voltage drop occurs over the length of the line, making it impossible to drive uniformly all pixels along the line (column).

A problem with the use of metallic column conductors is that separate deposition and lithographic procedures are required to form the column conductors and the pixel electrodes. The pixel electrodes must be transparent, and are typically formed from a transparent conductive oxide film. It is well known that the lithography steps in the manufacturing process are a major contributing factor to the expense of the manufacturing process. Each lithographic step can be considered to reduce the yield of the process, as well as increasing the cost.

Figure 2:
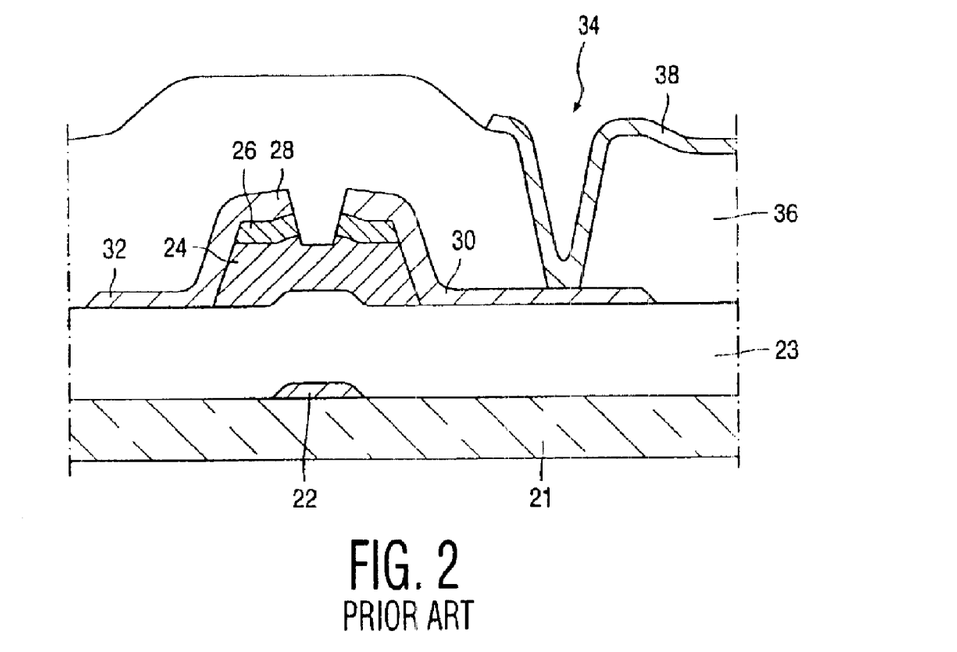
FIG. 2 shows a conventional active plate using bottom gate TFTs and manufactured using a five mask process.

The conventional manufacturing process for the active plate of an LCD is a five mask process. With reference to the bottom gate TFT LCD active plate shown in FIG. 2, the process steps, each requiring a separate mask definition, are:

(i) defining the gate 22 (which is part of the row conductor) over the substrate 21;

(ii) defining the amorphous silicon island (which overlies a gate dielectric 23 which covers the entire structure), comprising a lower intrinsic layer 24 and an upper doped contact layer 26;

(iii) defining the metallic source 28, drain 30 and column electrode 32;

(iv) defining a contact hole 34 in a passivation layer 36 which covers the entire substrate; and (v) defining the transparent pixel electrode 38 which contacts the drain 10 through the hole 34.

The capacitor shown in FIG. 1 may simply be formed from the gate dielectric by providing an area of overlap of one pixel electrode with a portion of the row/gate conductor of the adjacent row.

There have been various proposals to reduce the number of lithography steps, and thereby the mask count, of the manufacture process in order to reduce cost and increase yield.

Figure 3:
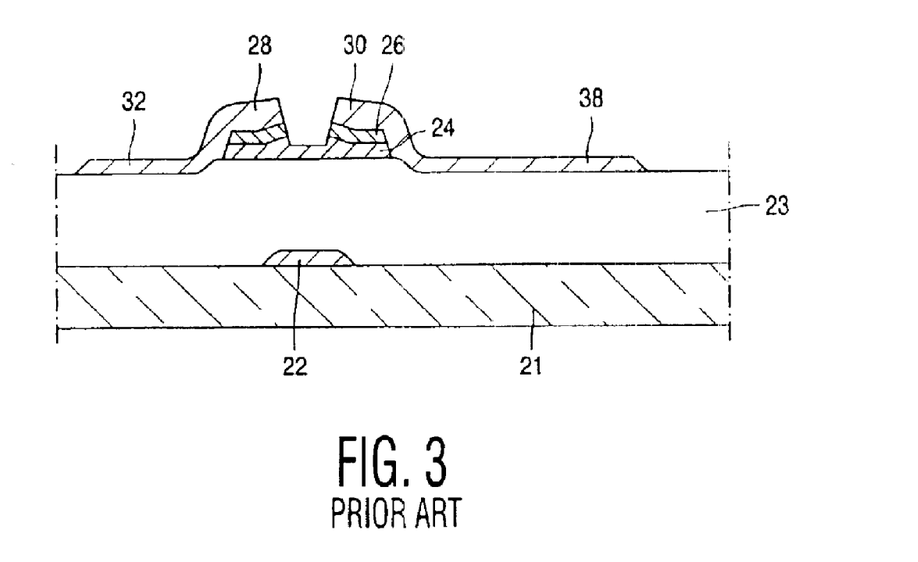
FIG. 3 shows a proposed active plate using bottom gate TFTs and manufactured using a two mask process.

For example, it has been proposed to form the column conductors from the same transparent conductive oxide film as the pixel electrode, so that these components of the pixel structure can be deposited and patterned together. Additional measures can result in a two mask process, and this is explained with reference to the bottom gate TFT LCD active plate shown in FIG. 3. The process steps, each requiring a separate mask definition, are:

(i) defining the gate 22 (and row conductors); and (ii) defining the transparent column electrode 32 (which also forms the TFT source 28) and the pixel electrode 38 (which also forms the TFT drain 30).

The definition of the semiconductor island 24, 26 can be achieved by a self-aligned process using the gate 22, for example by using UV exposure through the substrate. Of course, the semiconductor could equally be formed with a third mask step (between steps (i) and (ii) above). In the periphery of the array, the gate dielectric 23 is etched away using a low-precision stage, to allow contact to the gate lines at the periphery of the display.

In this structure, the high resistivity of the transparent conductive oxide film used for the column lines prevents the use of the structure in large (TV-sized) displays or in higher resolution displays, for example above VGA.

For this reason, there are further proposals to treat the column conductor area of the layer to increase the conductivity, whilst not affecting the transparency of the pixel electrode. For example, the article "Conductivity Enhancement of Transparent Electrode by Side-Wall Copper Electroplating", J. Liu et al, SID 93 Digest, page 554 discloses a method of enhancing the conductivity by electroplating a copper bus to the side of the metal oxide column line. The process involves an incomplete etching process to leave metal oxide residues, which act as seeds for the copper growth. The process is complicated and difficult to control. In addition, the copper bus will surround the source and drain electrodes, and there is a risk of shorts between the source and drain resulting from fast lateral copper growth when forming the bus. The copper bus around the source and drain electrodes also influences the channel length of the TFT and therefore makes the TFT characteristics unpredictable.

WO 99/59024 discloses a method for enhancing the conductivity of a transparent electrode by providing patterned metallic layers adjacent to the transparent electrodes.

There is still a need for a simple process for increasing the conductivity of a transparent metal oxide layer, such as ITO, without increasing dramatically the complexity of the process. Such a process will find application in active matrix LCD manufacture, but will also be useful for other technologies where mask count reduction could be achieved if a transparent conductive layer could be made to be more conductive without losing the transparency. This may be of benefit for polymer LEDs and large area image sensors.

According to a first aspect of the invention, there is provided a method of increasing the conductivity of a transparent conductive layer, comprising:

depositing and patterning a photoresist layer into a configuration corresponding to the desired pattern of the transparent conductive layer; and patterning the transparent conductor layer using the photoresist layer, wherein the edge regions of the photoresist layer are provided with a taper, the method further comprising the steps of:

partially etching the photoresist layer such that at least part of the edge regions are completely removed thereby exposing the underlying transparent conductor layer;

selectively plating the exposed parts of the transparent conductor layer with a metallic layer.

This method has a single patterning stage, but using partial etching of a tapered resist layer in order to expose a small edge region of the transparent layer for coating with a conductive layer (which can be opaque).

The tapered edge regions may be provided by a photoresist reflow technique. This does not need any masking steps, and can be achieved using a raised temperature baking process.

The step of selectively plating may comprise:

activating the exposed parts of the transparent conductive layer;

removing the partially etched photoresist layer;

performing electroless plating of the activated areas of the transparent conductive layer.

The removal of the photoresist can instead be after the plating operation.

The metallic layer preferably comprises copper or silver and the transparent conductor layer comprises a conductive oxide, for example ITO.

The increased conductivity transparent conductive layer can be used in liquid crystal display manufacture. For this purpose, according to a second aspect of the invention, there is provided a method of forming an active plate for a liquid crystal display, comprising:

depositing and patterning a gate conductor layer over an insulating substrate;

depositing a gate insulator layer over the patterned gate conductor layer;

depositing a silicon layer over the gate insulator layer;

depositing a transparent conductor layer over the silicon layer;

depositing and patterning a photoresist layer over the transparent layer having a configuration defining source and drain areas, pixel electrode areas and line conductor areas associated with the source or drain conductors; and patterning the transparent conductor layer using the photoresist layer, wherein edge regions of the photoresist layer are provided with a taper, the method further comprising:

partially etching the photoresist layer such that at least part of the edge regions are completely removed thereby exposing the underlying transparent conductor layer;

selectively plating the exposed parts of the transparent conductor layer with a metallic layer.

This method can enable a two mask process to be used, wherein the gate conductor is deposited and patterned with a first lithographic process and the photoresist layer is deposited and patterned with a second lithographic process, the silicon layer being self aligned to the gate conductor.

According to a third aspect of the invention, there is provided an active plate for a liquid crystal display, comprising:

a gate conductor layer, a gate insulator layer, and a silicon layer together defining pixel transistors;

a transparent conductor layer defining source and drain conductors for the pixel transistors and also defining column conductors each connected to one of the source and drain of an associated transistor, and also defining pixel electrodes; and a metallic layer overlying edge regions of the transparent conductor layer.

The metallic layer overlying the edge regions is the result of the method of the invention.

Each pixel may be associated with at least two column conductors, each column conductor having a metallic layer overlying both edges, and the two column conductors being connected together by a bridging portion. This reduces further the resistance of the columns, without increasing the required thickness of the metallic layer. The bridging portion may be completely covered by the metallic layer.

Alternatively, each column conductor may comprise a grid configuration, with all edges of the grid having an overlying metallic layer.

Examples of the invention will now be described in detail with reference to the accompanying drawings, in which.

It should be noted that the figures are diagrammatic and not drawn to scale. Relative dimensions and proportions of parts of these figures have been shown exaggerated or reduced in size, for the sake of clarity and convenience in the drawings.

Figure 4A:
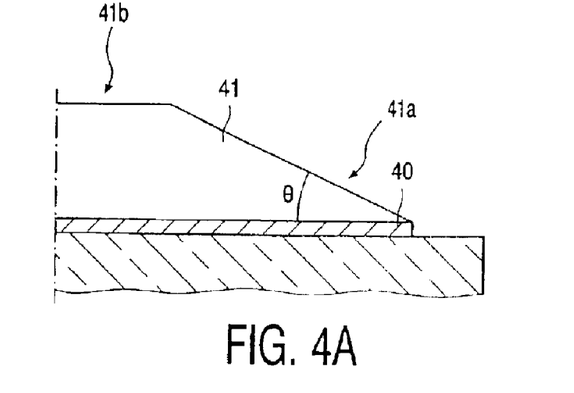
FIG. 4 is used to explain the principle behind the invention.
Figure 4B:
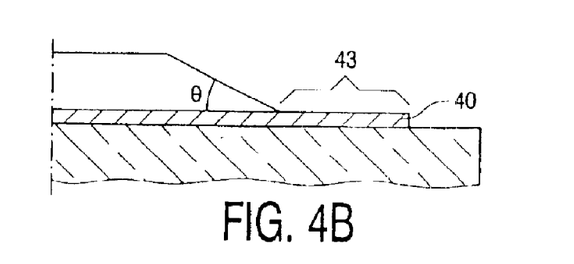

The principles behind the invention are explained with reference to FIG. 4. The invention involves patterning transparent conductive lines 40 such as ITO using a standard etching process, for example using a polymer resist pattern 41, such as photoresist. The resist must be left on the ITO, and made thinner at the edges 41a of the line than at the center 41b, as shown in FIG. 4A. This can be achieved using reflow of the photoresist. The resist is then thinned by partial etching (or ashing) in a plasma process to controllably leave an area 43 of exposed ITO, as shown in FIG. 4B. FIG. 4 schematically shows the photoresist having a straight taper. For example, 2 $\mu$m of photoresist with a tapered edge having an angle $\theta$ of approximately 26° is used to pattern the ITO. If an etching process is then used to remove 1 $\mu$m thickness of the photoresist, while not etching the underlying layers, then 2 $\mu$m of ITO 43 will be exposed at the edge of the line.

The exposed ITO is then selectively plated with a highly conducting metal, such as silver or copper, by either an electrolytic or electroless coating process. Any glass or other underlying layers must remain uncoated. An electrolytic coating requires electrical connections to be made to the ITO lines, and then the substrate to be given an appropriate plating process. Alternatively, selective electroless plating of the exposed ITO can be carried out. To do this, the exposed ITO 43 must be sensitised and/or activated prior to being immersed in a suitable electroless plating solution. The photoresist can be removed either before or after the substrate is immersed in the electroless plating solution. Preferably, the plating is carried out before the photoresist is removed, as this layer can be used to avoid the possibility of the metal adhering to the untreated ITO surface. The result is that the electroless plated metal will only be deposited on the area of the ITO from which the photoresist had been removed by the partial etching process. Calculations show that electroless plating of copper to a thickness of 750 nm on 2 $\mu$m wide strips on both sides of an ITO column would permit the driving of 45 inch diagonal, SXGA resolution displays. The required thickness of metal can be reduced, or the display size or resolution increased, by arranging the column to have increased edge area, as will be explained further below.

The application of the invention to a low mask count process for manufacturing the active plate of an active matrix liquid crystal display will now be described with reference to FIG. 5. The first steps of the process are common with known 2-mask processes.

Figure 5A:
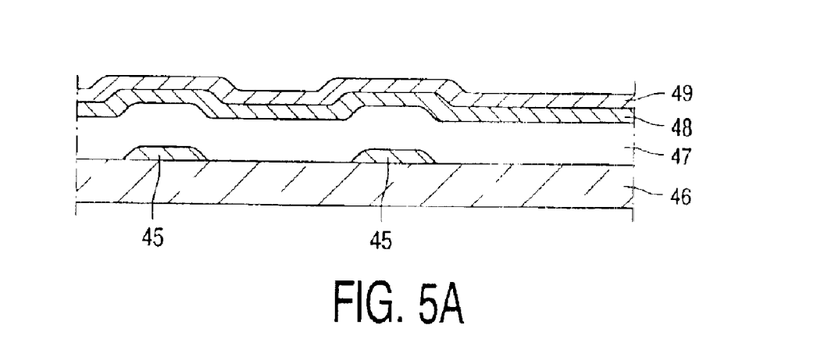
FIG. 5 shows the manufacturing process of the invention for manufacturing the active plate of an LCD display.

FIG. 5A is a schematic diagram of the first stages of a low mask count process. The gate metal 45 has been deposited and defined over the substrate 46, and a standard Back Channel Etch TFT stack deposition carried out. This provides a silicon nitride gate insulator layer 47, an amorphous silicon layer 48 and a doped silicon layer 49, which acts as a contact face. The area to the right of FIG. 5A will be used to form the switching transistors (12 of FIG. 1) whereas the left part of FIG. 5A will form the row lead-in areas, where driving signals can be applied to the row conductors. Typically, the SiN gate insulator 47 is 400 nm thick, the intrinsic amorphous silicon 48 is 160 nm thick and the doped amorphous silicon is 40 nm thick, although other thickness layers can be used. The doped silicon layer 49 may be microcrystalline silicon to give good quality ITO to silicon contacts.

Figure 5B:
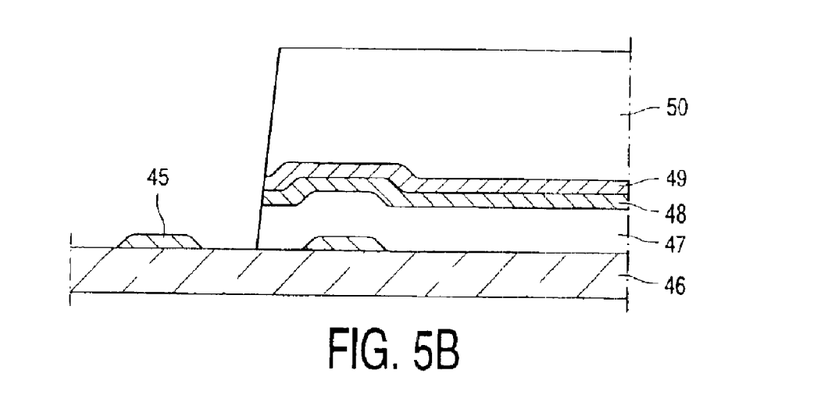
Figure 5C:
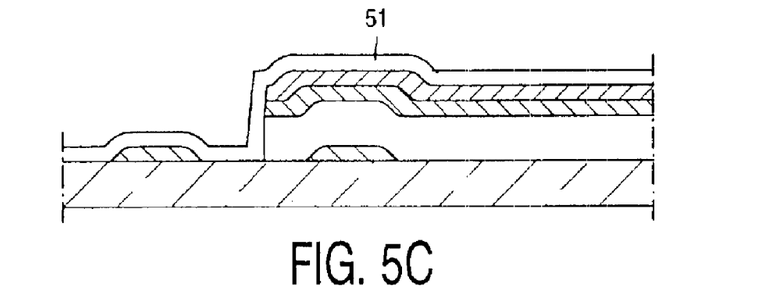

The TFT stack must be etched away from the row lead-in area. This only requires coarse alignment and no fine features to be etched. This masking step could be carried out by printing, laminating a plastic sheet on the array area before etching, or using coarsely aligned printed photoresist 50, as shown in FIG. 5B. In FIG. 5C, the TFT stack has been etched away from the row lead-in area, and a positive photoresist 51 is applied to the whole plate.

Figure 5D:
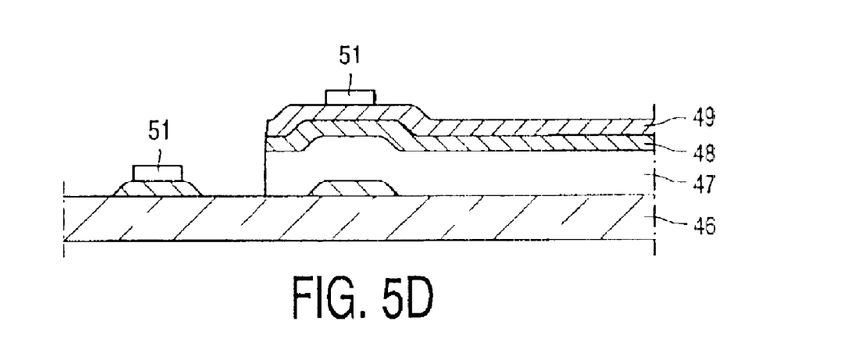
Figure 5E:
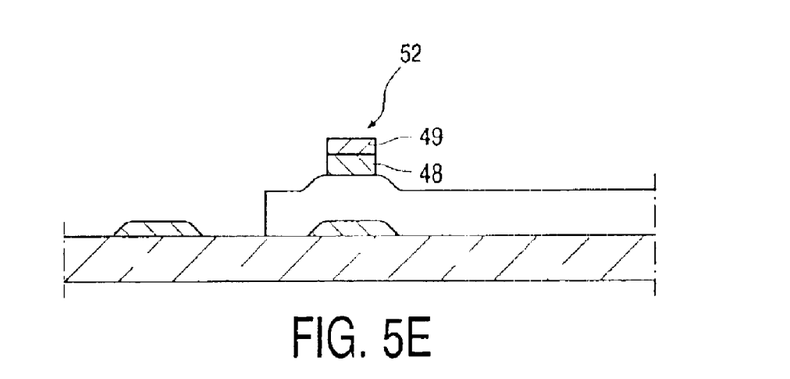
Figure 5F:
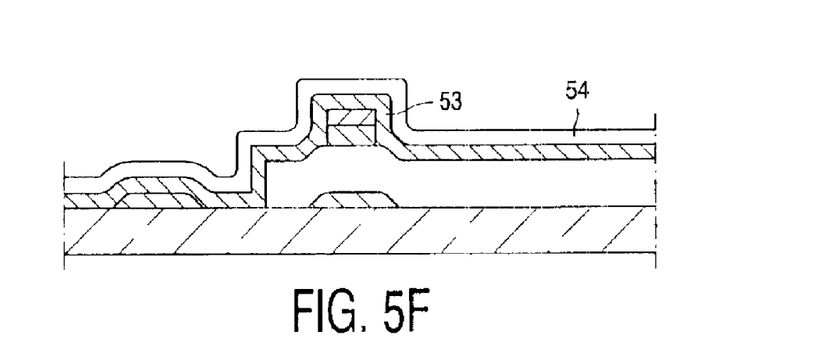
Figure 5G:
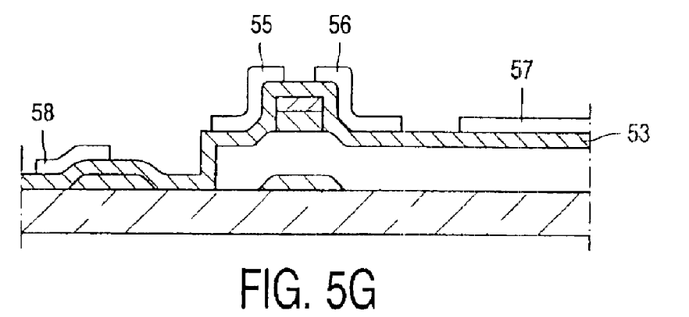

Rear illumination is used to pattern the positive photoresist to have the same pattern as the gate line, as shown in FIG. 5D. The remaining photoresist layer is used to pattern the two silicon layers to leave the transistor channel area 52 in FIG. 5E. The transparent conducting layer 53, for example sputtered ITO, is then applied over the whole plate. Photoresist 54 is applied and patterned to define the source and drain areas 55,56, the pixel electrode area 57 and a row lead-in pattern 58. These steps are shown in FIGS. 5F and 5G.

Figure 5H:
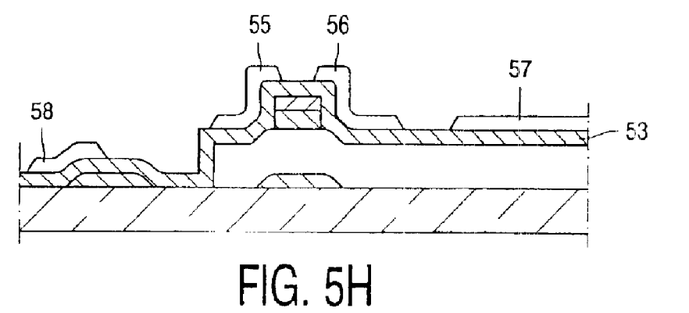

The steps in FIGS. 5A to 5G have previously been proposed. In order to implement the method of the invention, for improving the conductivity of the transparent layer 53, the photoresist should be subjected to a reflow process to produce a taper. The photoresist may in fact have a small taper after the standard development process and baking at 110° C. For the partial etching to leave an uncovered strip of ITO that is sufficiently wide (for example greater than 1 $\mu$m wide) the taper angle must be smaller. This can be achieved by a higher temperature bake to cause reflow of the photoresist. Photoresist reflow is a standard processing technique that is used to produce taper etching of underlying layers. The reflowed resist layer is shown in FIG. 5H.

Figure 5I:
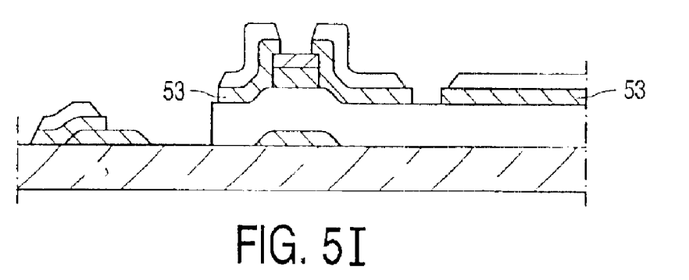

FIG. 5I shows the substrate after the reflowed photoresist has been used to pattern the transparent conductive layer 53. This can be done by a wet or dry etch process, but dry etching is probably preferred to minimise underetching of the ITO.

Reflowed tapered photoresist has been used in the past to produce tapered layers. Conventionally, the substrate is plasma etched using a process that etches the photoresist and underlying layer at similar rates. This transfers the taper pattern of the photoresist to the layer. In the process of the invention, a taper of the underlying layers is not required, so the photoresist is thinned using a plasma process that does not etch the underlying layers.

Figure 5J:
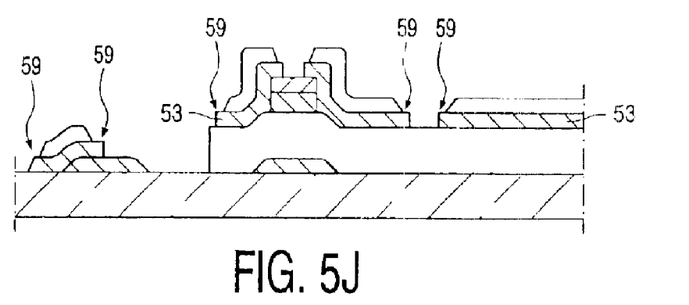
Figure 5K:
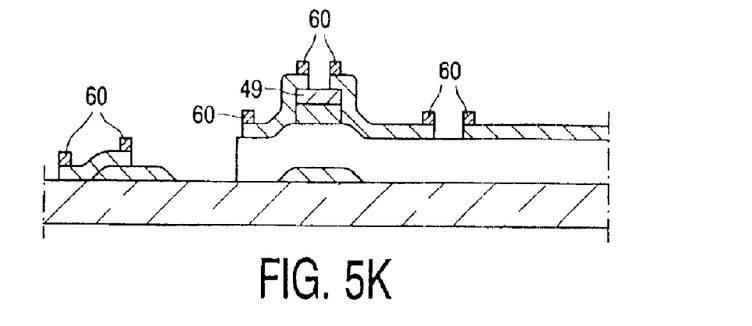
Figure 5L:
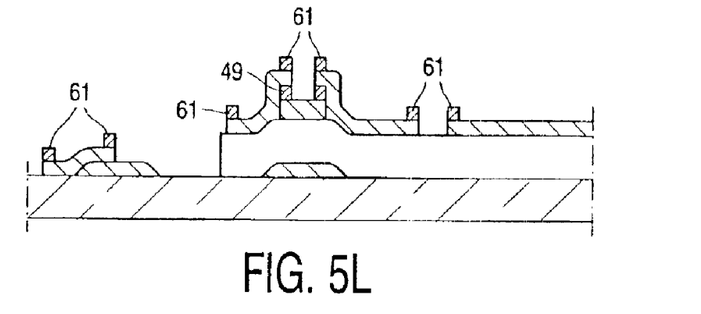

The partial etching of the photoresist is thus under conditions that do not attack any underlying ITO, a-Si, or SiN layers. This can be done in an oxygen plasma, possibly with the addition of other gases such as $SF_6$ or $CF_4$ to give improved control of the process. FIG. 5J shows the effect of the partial etching, which leaves a thin exposed strip 59 at either side of each area of the patterned transparent conductor layer 53.

These exposed strips 59 are then activated (schematically represented as 60 in FIG. 5K) for electroless deposition by dipping in solution containing palladium. The photoresist is then removed and copper or silver 61 is selectively deposited on the activated areas by electroless deposition, as shown in FIG. 6L, which also shows an area of the doped silicon layer 49 removed from the TFT channel region by standard etching process.

At the end of the process, the column conductors and pixels have a strip of copper near the edges. This ensures that light can pass through the pixel, while the copper down the column conductors gives high conductivity for addressing large, high resolution displays.

In the above described process example, entailing the step of activating the exposed strips 59 of ITO after reflow and partial etching of the resist by dipping in a palladium solution before electrolessly plating, there may be a risk of other exposed areas, for example regions of the silicon nitride layer 47, becoming contaminated with palladium and thereby affecting the self selective manner of plating. To avoid this, it may be preferred to use an alternative process in which the ITO material is suitably activated at an earlier stage in the processing. In this modified method, then immediately after sputtering the layer 53 of transparent conducting material (ITO) at the stage shown in FIG. 5F and without removing the structure from the deposition equipment, a thin layer of suitable activating material is applied by sputtering over the surface of the layer 53. This means that following the subsequent reflow and etching of the resist stage (FIG. 5J) the exposed regions 59 of the layer 53 are already appropriately activated and the possibility of palladium adhering to other areas of the structure is removed. In this case, it is of course necessary to leave the resist in situ whilst the plating is performed.

The activiting of the ITO for plating by the application of a palladium layer in the last stage of the process step in which the ITO is sputtered also has the advantage that the method is simplified to an extent by virtue of the number of processing steps being reduced in view of the fact that the palladium is deposited in the same sputter equipment as the ITO and the need for cleaning steps is avoided. Moreover, the adhesion of the palladium to the ITO is likely to be much better than that achieved through a wet chemically-deposited layer. The sputter deposited activation layer preferably is around at most only a few nanometers in thickness. So as not to affect unduly the transparency of the ITO at the pixel electrode regions 38. Platinum may be used instead of palladium as the activation material and similarly deposited.

In a variation of this modified method, a bilayer stack of Ti/pd, Cr/Pd or Mo/Pd (or alloys therefore) may be used for the activation layer deposited on the ITO. In these stacks, the Ti, Cr or Mo layer serves as an adhesion layer and this layer is formed very thinly, typically less than 5 nm, so as not to absorb any visible light and only scatter it to a small extent.

To enhance the conductivity for larger displays, or to reduce the required plated metal thickness, the column conductors can be split into two or more. These need to be connected by cross-beams several times to ensure that the current is carried down both columns.

Figure 6A:
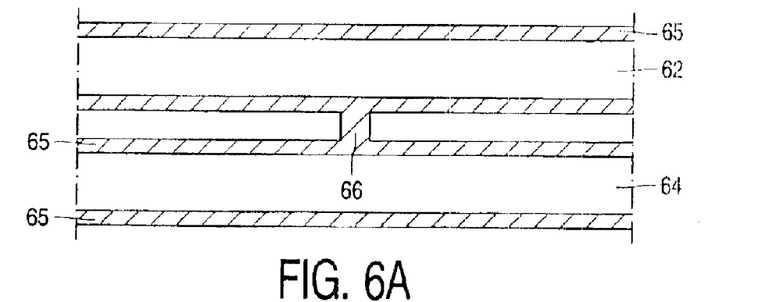
FIG. 6 shows alternative column layouts.

FIG. 6A shows two plated columns 62,64 to double the conductivity. Each column conductor has a metallic layer 65 overlying both edges, and the two column conductors are connected together by a number of bridging portions 66, which are completely covered by the metallic layer. This is achieved by providing the bridging portion with a width which is less than twice the distance that the photoresist is pulled back from the edge.

Figure 6B:
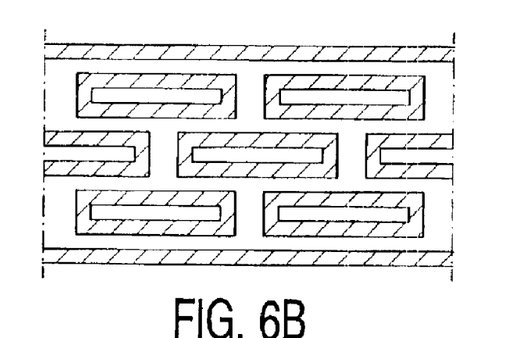

FIG. 6B shows an arrangement in which each column conductor comprises a grid configuration, with all edges of the grid having an overlying metallic layer. In this case, the conductivity is almost three times that of a single column.

When the enhanced conductivity columns are used with a low mask count technology, as shown in the embodiment above, then the amorphous silicon lying above the rows introduces parasitic TFTs that will affect the driving of the display. The effect of these can be accommodated in the driving scheme, and they can be minimised by careful design.

Figure 7:
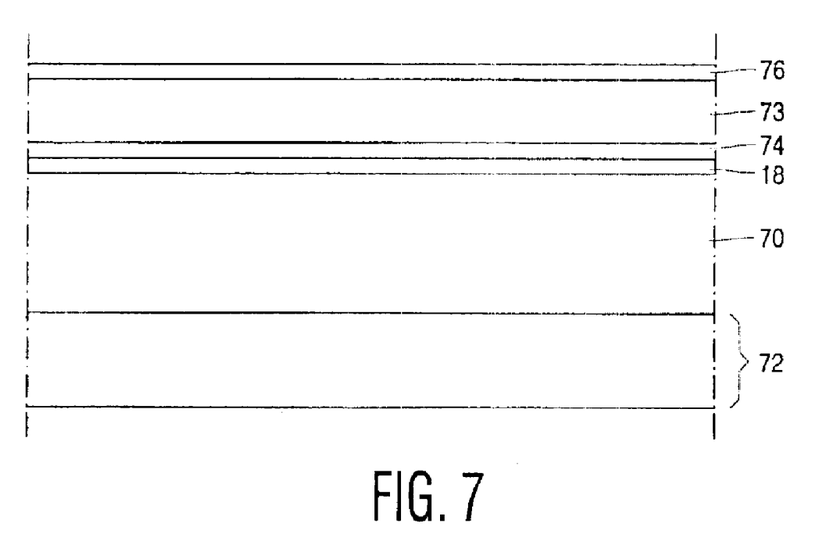
FIG. 7 shows the structure of a complete liquid crystal display.

FIG. 7 shows the structure of a complete liquid crystal display. A layer of liquid crystal material 70 is provided over the active plate 72, which comprises the structure described above. A further substrate 73 overlies the layer of liquid crystal material. This further substrate 73 may be provided on one face with an arrangement of colour filters 74 and a plate defining the common electrode 18 (shown in FIG. 1). A polarizing plate 76 is also provided on the opposite side of the substrate 72.

As this invention is concerned specifically with the transistor substrate, the operation and construction of the liquid crystal display will not be described in any further detail as this will be apparent to those skilled in the art.

The specific examples described provide Cu, or silver plating on ITO transparent electrodes. Other conductive oxide transparent electrodes may be used, and other metals may be plated. These possibilities fall within the scope of the invention.

Additional layers to those described may be provided, and there are various alternatives which will be apparent to those skilled in the art. The specific processing parameters and materials have not been described in detail in this application, as this invention relies upon known individual processing steps and materials. The steps, and the range of possible alternatives, will be apparent to those skilled in the art.

The specific example above uses amorphous silicon TFTs in the active plate of the LCD, but other semiconductor arrangements are possible, such as polycrystalline or microcystalline.

In the specific example described, bottom gate transistors are used, but top gate transistors may also be used. In fact, the invention can be applied to any pixellated device in which a transparent pixel electrode is required and where there may be benefit in combining the deposition of the layer defining the pixel electrode with line (row or column) conductors.

What is claimed is:

1. An active plate for a liquid crystal display, comprising:
   a substrate;
   a gate conductor layer, a gate insulator layer, and a silicon layer together defining pixel transistors, the gate conductor layer being disposed between the substrate and the silicon layer;
   a transparent conductor layer defining source and drain conductors for the pixel transistors and also defining column conductors each connected to one of the source and drain of an associated transistor, and also defining pixel electrodes; and
   a metallic layer overlying edge regions of the transparent conductor layer.

2. An active plate according to claim 1, wherein each pixel is associated with at least two column conductors, each column conductor having a metallic layer overlying both edges, and the two column conductors being connected together by a bridging portion.

3. An active plate according to claim 2, wherein the bridging portion is completely covered by the metallic layer.

4. An active plate according to claim 1, wherein each column conductor comprises a grid configuration, with all edges of the grid having an overlying metallic layer.

5. An active plate according to claim 1, wherein each column conductor has at least a non-edge portion that the metallic layer does not overlie.

6. The active plate of claim 1, wherein the metallic layer overlies two parallel edges of the column conductors.

7. The active plate of claim 1, wherein the metallic layer overlies edge regions of both the source conductors and the drain conductors.

8. An active plate for a liquid crystal display, comprising:
   a substrate;
   a gate conductor layer and a gate insulator layer, stacked together beneath a silicon layer on the substrate to define gate structures for pixel transistors, each said pixel transistor having a corresponding source and drain;
   a transparent conductor layer defining transparent source and drain electrodes for the pixel transistors, defining transparent column conductors each connected to one of the source and drain electrodes of associated ones of the pixel transistors, and defining transparent pixel electrodes, wherein each of the source and drain electrodes are disposed adjoining a portion of the silicon layer; and
   a metallic layer overlying edge regions of the column conductors, and also overlying edge regions of the pixel electrodes.

9. The active plate of claim 8, wherein at least a portion of non-edge regions of the column conductors is exposed through the metallic layer.

10. The active plate of claim 8, wherein the metallic layer also overlies edge regions of the transparent source and drain electrodes.

11. The active plate of claim 10, wherein the metallic layer does not overlie at least a portion of non-edge regions of the column conductors.

12. The active plate of claim 8, wherein the metallic layer includes at least one of palladium and platinum.

13. The active plate of claim 8, wherein the transparent conductor layer includes indium tin oxide (ITO).

14. The active plate of claim 8, wherein the column conductors are disposed in pairs, the metallic layer overlying both edges of each column conductor, and wherein the two column conductors of each pair are connected together by a bridging portion.

15. The active plate of claim 14, wherein the bridging portion is completely covered by the metallic layer.

16. The active plate of claim 8, wherein each column conductor comprises a grid configuration, with the metallic layer overlying all edges of the grid.

* * * * *